US007006717B2

(12) United States Patent
Liu et al.

(10) Patent No.: US 7,006,717 B2
(45) Date of Patent: Feb. 28, 2006

(54) METHOD AND APPARATUS FOR POLARIZATION INSENSITIVE PHASE SHIFTING OF AN OPTICAL BEAM IN AN OPTICAL DEVICE

(75) Inventors: Ansheng Liu, Cupertino, CA (US); Richard Jones, Santa Clara, CA (US); Mario J. Paniccia, Santa Clara, CA (US); Graham T. Reed, Godalming (GB)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 10/775,737

(22) Filed: Feb. 10, 2004

(65) Prior Publication Data

US 2005/0175305 A1 Aug. 11, 2005

(51) Int. Cl.
*G02F 1/295* (2006.01)
(52) U.S. Cl. ............................ 385/8; 385/129; 359/245; 359/248
(58) Field of Classification Search ................ 385/4–5, 385/8–9, 14, 129–132; 359/237–239, 245, 359/248, 251–252, 257, 279
See application file for complete search history.

(56) References Cited

U.S. PATENT DOCUMENTS 4,958,898 A * 9/1990 Friedman et al. .............. 385/3

FOREIGN PATENT DOCUMENTS

JP 09043557 2/1997

OTHER PUBLICATIONS

Zhu et al., "Polarization independent δ-strained InGaAs/InGaAsP quantum well waveguide modulator", Jan. 20, 2000, Electronic Letters, vol. 36, No. 2, pp. 164-166.*
Stubkjaer et al., "Recent advances in semiconductor optical amplifiers and their applications", Apr. 21, 1992, Fourth International Conference on Indium Phosphide and Related Materials, pp. 242-244.*
Cutolo, A., "An Electrically Controlled Bragg Reflector Integrated In A Rib Silicon On Insulator Waveguide," Appl. Phys. Lett. 71 (2) (Jul. 14, 1997), pp. 199-201.
Barrios, C. A., "Electrooptic Modulation of Silicon-On-Insulator Submicrometer-Size Waveguide Devices," Journal of Lightwave Technology, vol. 21, No. 10, (Oct. 2003), pp. 2332-2339.

(Continued)

*Primary Examiner*—Sung Pak
(74) *Attorney, Agent, or Firm*—Blakely, Sokoloff, Taylor & Zafman LLP (57) ABSTRACT

An apparatus and method for modulating a phase of optical beam independent of polarization. In one embodiment, an apparatus according to embodiments of the present invention includes a first region of an optical waveguide disposed in semiconductor material, the first region having a first conductivity type, and a second region of the optical waveguide disposed in the semiconductor material, the second region having a second conductivity type opposite to the first conductivity type. The apparatus also includes a substantially V shaped insulating region disposed between the first and second regions of the optical waveguide, wherein a vertex of the substantially V shaped insulating region forms an intersecting line that is substantially parallel to an optical path of an optical beam to be directed through the optical waveguide.

24 Claims, 7 Drawing Sheets

OTHER PUBLICATIONS

Yamada, K. et al., "Low polarization dependence (<0.3dB) in an EA modulator using a polyimide-buried high-mesa ridge structure with an InGaAsP bulk absorption layer," Electronics Letters, vol. 31, No. 3, Feb. 2, 1995, pp. 237-238.

Tang, C. K. et al., "Highly efficient optical phase modulator in SOI waveguides," Electronics Letters, vol. 31, No. 6, Mar. 16, 1995, pp. 451-452.

Png, C. E. et al., "Development of small Silicon modulators in Silicon-On-Insulator (SOI)," Proceedings of SPIE, vol. 4997, 2003, pp. 190-197.

PCT/US2005/001601, PCT Search Report and Written Opinion, Jun. 8, 2005.

* cited by examiner

METHOD AND APPARATUS FOR POLARIZATION INSENSITIVE PHASE SHIFTING OF AN OPTICAL BEAM IN AN OPTICAL DEVICE

BACKGROUND OF THE INVENTION

1. Field of the Invention

The present invention relates generally to optics and, more specifically, the present invention relates to phase shifting optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for polarization insensitive phase shifting an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having a complementary metal oxide semiconductor (CMOS) capacitor type structure adapted to phase shift an optical beam in response to a signal. Embodiments of the disclosed optical devices can be used in a variety of high bandwidth applications including multi-processor, telecommunications, networking as well as other high speed optical applications such as optical delay lines, switches, modulators, add/drops, or the like.

In one embodiment, the CMOS capacitor type structure is adapted to modulate a charged region proximate to a substantially V shaped insulating region in the waveguide. An optical beam is to be directed through the waveguide and through the charge modulated region proximate to the substantially V shaped insulating region to phase shift the optical beam. Polarization independent phase efficiency is realized according to embodiments of the present invention with the utilization of the substantially V shaped insulating region through the optical waveguide. As will be discussed, the substantially orthogonal relationship between the planes of the substantially V shaped insulating region according to embodiments of the present invention result in substantially polarization insensitive phase shifting of an arbitrarily polarized optical beam because the transverse electric field (TE) and transverse magnetic field (TM) mode components of the optical beam propagate at right angles with respect to each other through the optical waveguide.

Figure 1:
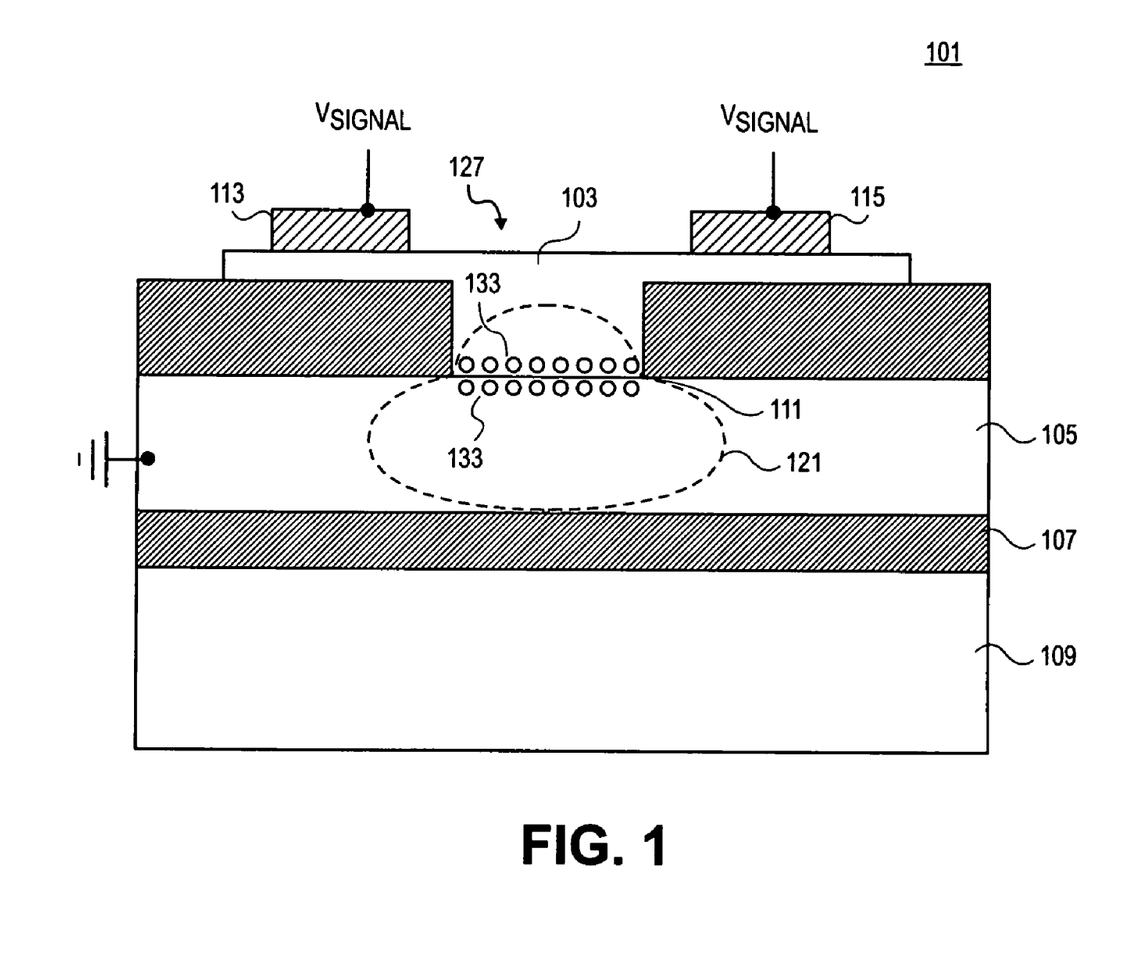
FIG. 1 is a cross-section illustration of an optical device including a charge modulated region proximate to a planar shaped insulating region in an optical waveguide, wherein the optical device exhibits a strong polarization dependence.

To illustrate, FIG. 1 is a cross-section illustrating generally an optical device including a charge modulated region proximate to a planar shaped insulating region in an optical waveguide. As shown in FIG. 1, optical device 101 includes a first region of semiconductor material 103 having a first conductivity type and a second region of semiconductor material 105 having a second conductivity type. A planar insulating region 111 is disposed between semiconductor material regions 103 and 105. As illustrated in FIG. 1, optical device 101 is fabricated on a silicon-on-insulator (SOI) wafer and therefore includes a buried insulating layer 107 and a layer of semiconductor material 109. An optical waveguide 127 is included in optical device 101, through which an optical beam 121 is directed along an optical path. The optical path along which optical beam 121 is directed is along an axis that is parallel to the axis of the optical waveguide of optical device 101. Thus, the optical path and therefore optical beam 121 are shown to propagate along a direction going through, or coming in and out of, the page. As shown in FIG. 1, semiconductor material region 105 is grounded and semiconductor material region 103 is coupled to receive $V_{SIGNAL}$ through contacts 113 and 115.

In operation, optical beam 121 is directed through optical waveguide 127 along an optical path through charge modulated region 133. $V_{SIGNAL}$ is applied to optical waveguide 127 to modulate the free charge carrier concentration in charge modulated region 133 proximate to planar insulating region 111, or at the interfaces between insulating region 111 and regions of semiconductor material 103 and 105. The applied voltage from $V_{SIGNAL}$ changes the free charge carrier density in charge modulated region 133, which results in a change in the refractive index of the semiconductor material in optical waveguide 127.

In operation, optical beam 121 is directed through optical waveguide 127 along an optical path through charge modulated region 133. $V_{SIGNAL}$ is applied to optical waveguide 127 to modulate the free charge carrier concentration in charge modulated region 133 at the interfaces between insulating region 111 and regions of semiconductor material 103 and 105. The applied voltage from $V_{SIGNAL}$ changes the free charge carrier density in charge modulated region 133, which results in a change in the refractive index of the semiconductor material in optical waveguide 127.

Optical device 101 of FIG. 1 exhibits a strong polarization dependence of phase efficiency. For instance, when a polarization of optical beam 121 is parallel to planar insulating region 111, or the interfaces between insulating region 111 and semiconductor material regions 103 and 105, the phase efficiency is substantially larger, such as for example approximately seven times (7×) larger, than that for a polarization of optical beam 121 that is perpendicular to planar insulating region 111. As a consequence, the efficiency of optical device 101 on phase shifting optical beam 101 is dependent on the polarization of the optical beam 121 that is directed through the optical waveguide 127.

Figure 2:
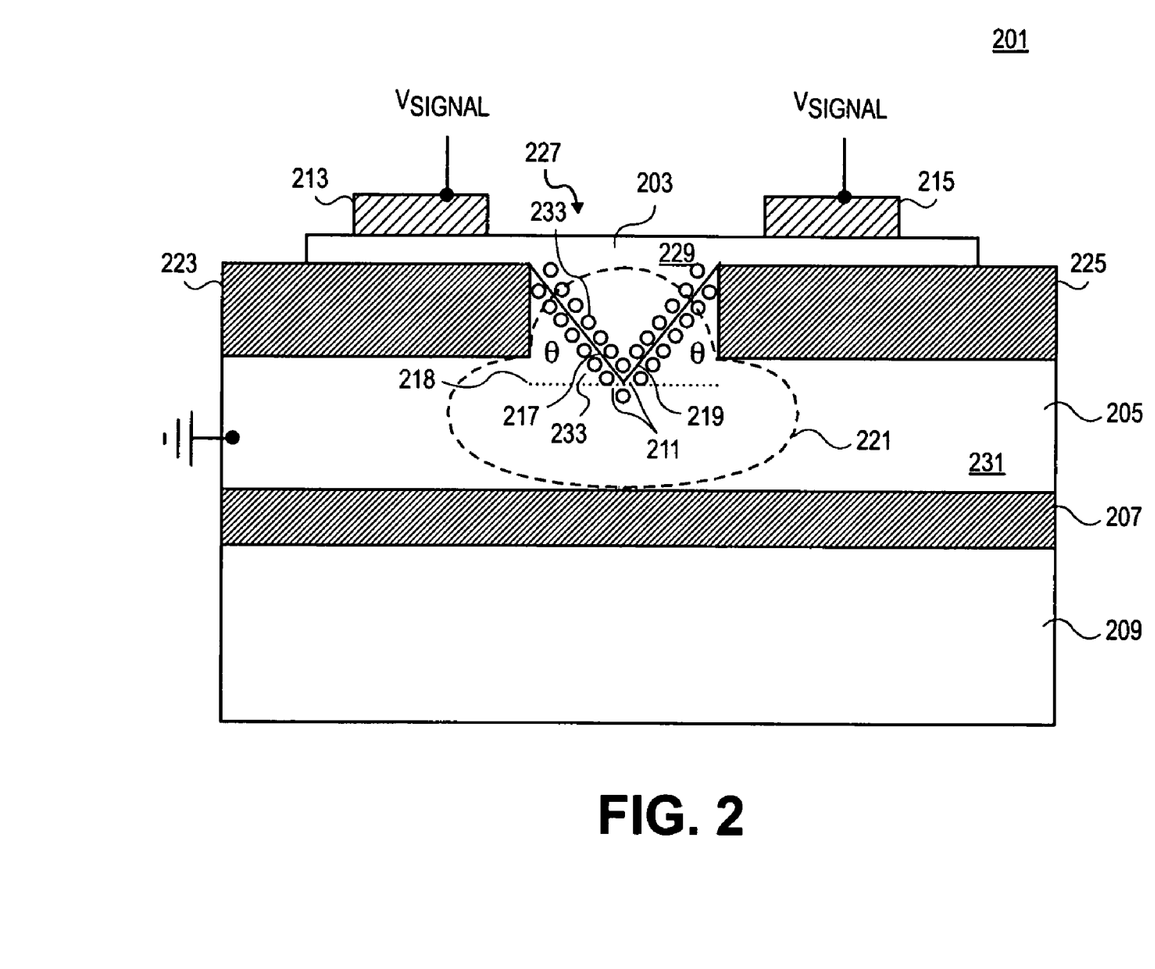
FIG. 2 is a cross-section illustration of one embodiment of an optical device including a charge modulated region proximate to a substantially V shaped insulating region in an optical waveguide, wherein the optical device exhibits polarization independence in accordance with the teachings of the present invention.

FIG. 2 is a cross-section illustration of one embodiment of an optical device including a charge modulated region proximate to a substantially V shaped insulating region in an optical waveguide. The optical device of FIG. 2 exhibits polarization independence according to embodiments of the present invention. As shown in FIG. 2, optical device 201 includes a first region of semiconductor material 203 having a first conductivity type and a second region of semiconductor material 205 having a second conductivity type. In one embodiment, semiconductor material 203 includes silicon with p-type dopants and semiconductor material 205 includes silicon with n-type dopants. It is appreciated that the polarities of the dopants are provided for explanation purposes and that the polarities of the dopants and corresponding voltages may be reversed in accordance with the teachings of the present invention. In one embodiment, a substantially V shaped insulating region 211 is disposed between semiconductor material regions 203 and 205. As illustrated in FIG. 2, one embodiment of optical device 201 is fabricated on a silicon-on-insulator (SOI) wafer and therefore includes a buried insulating layer 207 and a layer of semiconductor material 209.

In one embodiment, an optical waveguide 227 is included in optical device 201, through which an optical beam 221 is directed along an optical path. In the embodiment illustrated in FIG. 2, waveguide 227 is a rib waveguide including a rib region 229 and a slab region 231. In one embodiment, optical beam 221 includes infrared or near infrared light. For example, in one embodiment, optical beam 221 has a wavelength near approximately 1.3 μm or 1.55 μm. In the embodiment illustrated in FIG. 2, the optical path along which optical beam 221 is directed is along an axis that is parallel to the axis of the optical waveguide of optical device 201. In the example shown in FIG. 2, the optical path and therefore optical beam 221 are shown to propagate along a direction going through, or coming in and out of, the page. In the embodiment of FIG. 2, the vertex of the "V" of the substantially V shaped insulating region 221 forms an intersecting line that is also substantially parallel to the optical path along which optical beam 221 is directed through the optical waveguide 227.

As shown in the embodiment of FIG. 2, semiconductor material region 205 is grounded and semiconductor material region 203 is coupled to receive $V_{SIGNAL}$ through contacts 213 and 215. In one embodiment, contacts 213 and 215 are metal contacts that are coupled to semiconductor material region 205 at locations outside the optical path of optical beam 221. The application of $V_{SIGNAL}$ to optical waveguide, as shown in FIG. 2, results in the modulation of free charge carriers in charge modulated region 233, which is proximate to substantially V shaped insulating region 211 and through which optical beam 221 is directed. As can be appreciated to a person skilled in the art having the benefit of this disclosure, a CMOS capacitor type structure is therefore provided according to embodiments of the present invention where the highly charged regions on opposite sides of substantially V shaped insulating region 211 represent the plates of the CMOS capacitor-type structure.

In one embodiment, a buffer of insulating material 223 and a buffer of insulating material 225 are also included in an optical device 201 in accordance with the teachings of the present invention. As shown in FIG. 2, buffer 223 is disposed between contact 213 and the optical path of optical beam 221. Buffer 225 is disposed between contact 215 and the optical path of optical beam 221. In one embodiment, buffers 223 and 225 are made of materials having lower refractive indexes than the refractive index of the core of waveguide 227. As a result, buffers 223 and 225 serve as cladding so as to help confine optical beam 221 to remain within waveguide 227. In the embodiment illustrated in FIG. 2, buried insulating layer 207 also serves as cladding so as to help confine optical beam 221 to remain within waveguide 227. In one embodiment, buffers 223 and 225 also serve as electrical isolators so as to electrically isolate the contacts coupled to waveguide 227 from the optical electric field guided from optical beam 221.

In operation, optical beam 221 is directed through optical waveguide 227 along an optical path through charge modulated region 233. $V_{SIGNAL}$ is applied to optical waveguide 227 to modulate the free charge carrier concentration in charge modulated region 233 at the interfaces between substantially V shaped insulating region 211 and regions of semiconductor material 203 and 205. The applied voltage from $V_{SIGNAL}$ changes the free charge carrier density in charge modulated region 233, which results in a change in the refractive index of the semiconductor material in optical waveguide 227. In one embodiment, the free charge carriers in charge modulated region 233 may include for example electrons, holes or a combination thereof.

In one embodiment, the phase of optical beam 221 that passes through charge modulated region 233 is modulated in response to $V_{SIGNAL}$. In one embodiment, the phase of optical beam 221 passing through free charge carriers in charge modulated region 233, or the absence of free charge carriers, in optical waveguide 227 is modulated due to the plasma optical effect. The plasma optical effect arises due to an interaction between the optical electric field vector and free charge carriers that may be present along the optical path of the optical beam 221 in optical waveguide 227. The electric field of the optical beam 221 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 227 of optical device 201 is modulated in response to the modulation of free charge carriers charge modulated region 233. The modulated index of refraction in the waveguide of optical device 201 correspondingly modulates the phase of optical beam 221 propagating through optical waveguide 227 of optical device 201. In addition, the free charge carriers in charge modulated region 233 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift φ is given approximately by $$\phi = (2\pi/\lambda)\Delta n L \qquad \text{(Equation 1)}$$

with the optical wavelength λ, the refractive index change Δn and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

As can be observed in FIG. 2, one embodiment of substantially V shaped insulating region 211 can be characterized as being formed with two planar regions of insulating material 217 and 219, which are angled with respect to each other, forming the "V" shape. For purposes of this disclosure, it is appreciated that the precise shape of the "V" of substantially V shaped insulating region 211 may deviate from exact "V" shape embodiment illustrated in FIG. 2 for explanation purposes. For example, the bottom tip or vertex of the "V" may flattened, blunted or rounded, or the "V" shape may be included in a zigzagged "W" or "M" shaped structure, etc. However, in all of these various embodiments, the substantially V shaped insulating region 211 includes a least the two regions of insulating material, which are angled with respect to each other in accordance with the teachings of the present invention.

In one embodiment, regions 217 and 219 of insulating material may be substantially orthogonal relationship to each other. In another embodiment, regions 217 and 219 of insulating material may be angled with respect to one another at angles other than 90 degrees. Similar to the discussion above, in one embodiment, when a polarization of optical beam 221 is parallel to one of the regions 217 or 219 of insulating material, the phase efficiency is substantially larger, such as for example approximately seven times (7×) larger, than that for a polarization of optical beam 221 that is perpendicular to the same region 217 or 219 of insulating material.

For explanation purposes, assume for example that a polarization of optical beam 221 is parallel to region 217 of substantially V shaped insulating region 211. The phase efficiency would be for example seven times (7×) larger than that for a polarization of optical beam 221 that is perpendicular to region 217 of substantially V shaped insulating region 211. However, since regions 217 and 219 are substantially orthogonal to each other, the polarization of optical beam 221 that is substantially perpendicular to region 217 is parallel to region 219. Similarly, a polarization of optical beam 221 that is perpendicular to region 219 is substantially parallel to region 217. Therefore, with charge modulated region 233 proximate to substantially V shaped insulating region 211, optical device 201 exhibits polarization independence when modulating the phase of optical beam 211 in accordance with the teachings of the present invention.

To further illustrate, assume that regions 217 and 219 of substantially V shaped insulating region 211 are each aligned with an angle θ relative to the horizontal line 218 illustrated in the embodiment shown in FIG. 2. In one embodiment, assume that angle θ is close to 45 degrees or that regions 217 and 219 of substantially V shaped insulating region 211 are formed with an approximate 90 degree angle relative to each other. Continuing with this example, let the waveguide effective index change for region 217 or 219 of substantially V shaped insulating region 211 with the electric field component parallel to the region 217 or 219 be equal to Δn. Thus, for the electric field component that is perpendicular to the region 217 or 219, the induced waveguide effective index change is substantially less, or for example Δn/7, due to the smaller phase efficiency as discussed above.

In an embodiment with semiconductor material regions 203 and 205 including silicon, and with substantially V shaped insulating region 211 including regions 217 and 219 being oxide layers having thicknesses of approximately 5–12 nanometers, a single mode waveguide is realized for optical waveguide 227. The optical waveguide 227 has one optical mode for the TE mode polarization component and one optical mode for the TM mode polarization component of optical beam 221. In one embodiment, for the TE mode polarization component, the total waveguide effective index change is for example $$2[\Delta n \cdot \cos\theta + (\Delta n/7) \cdot \sin\theta], \quad \text{(Equation 3)}$$

while the total waveguide effective index change the TM mode polarization component is for example $$2[(\Delta n 7) \cdot \cos\theta + \Delta n \cdot \sin\theta]. \quad \text{(Equation 4)}$$

Therefore, when the angle θ in the embodiment illustrated in FIG. 2 is substantially equal to 45 degrees, the total induced index change is substantially the same for both TE and TM mode polarization components of optical beam 221. Thus, substantially polarization independent phase efficiency is obtained with an optical phase shifter of optical device 201 in accordance with the teachings of the present invention.

Figure 3:
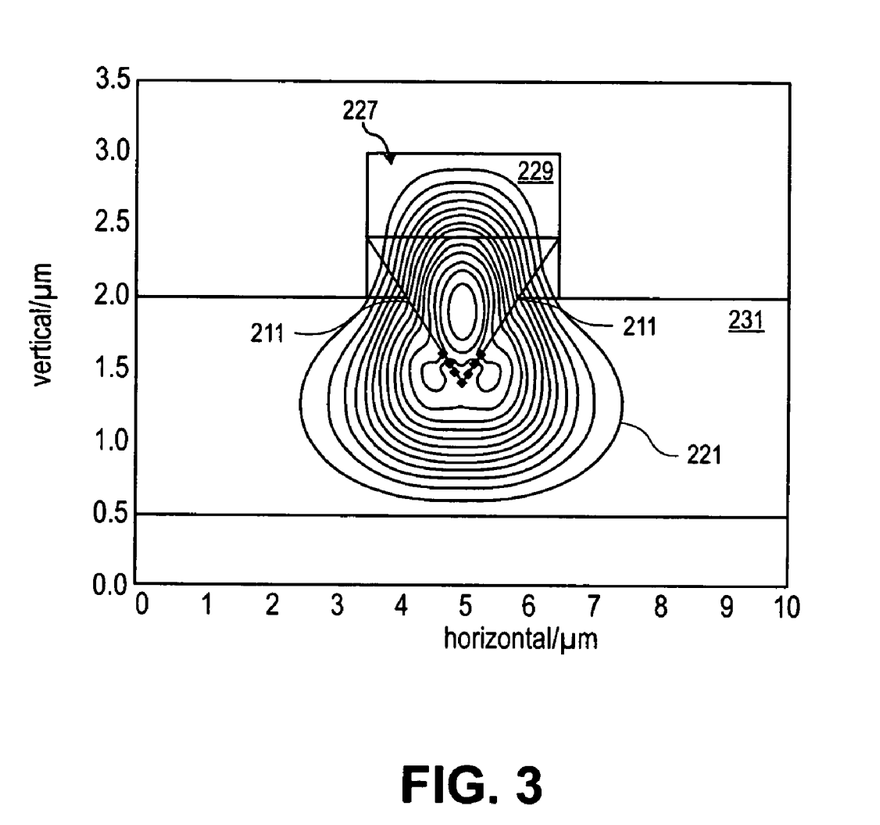
FIG. 3 is a diagram illustrating vectorial modeling of the transverse electric field (TE) mode of optical beam directed through one embodiment of an optical device including a charge modulated region proximate to a substantially V shaped insulating region in an optical waveguide in accordance with the teachings of the present invention.
Figure 4:
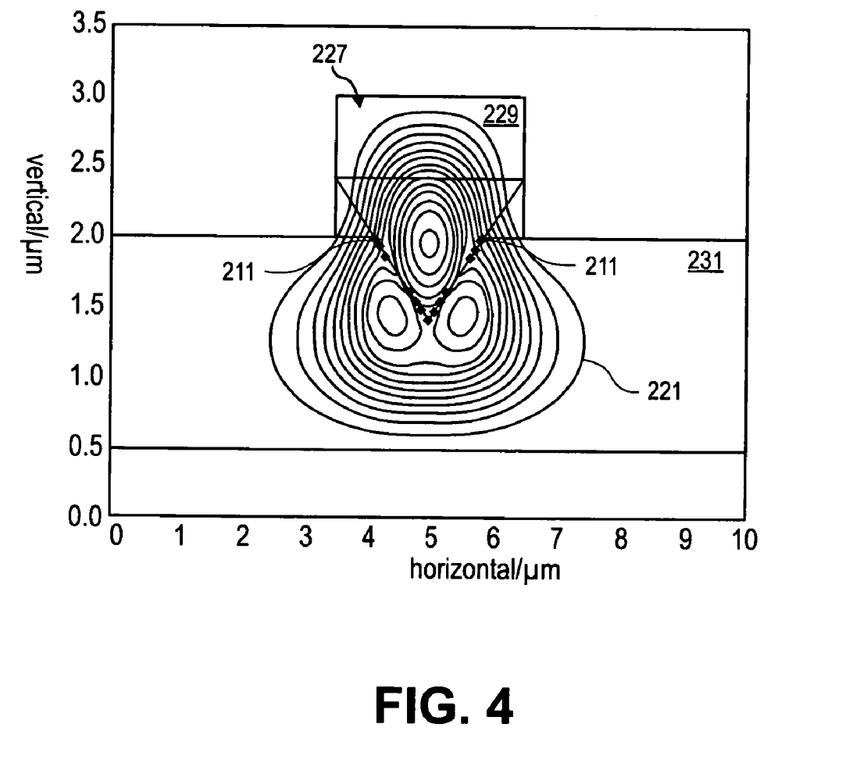
FIG. 4 is a diagram illustrating vectorial modeling of the transverse magnetic field (TM) mode of optical beam directed through one embodiment of an optical device including a charge modulated region proximate to a substantially V shaped insulating region in an optical waveguide in accordance with the teachings of the present invention.

To illustrate the polarization independence of optical device 201, FIG. 3 is a diagram illustrating vectorial modeling of the TE mode polarization component of optical beam 221 and FIG. 4 is a diagram illustrating vectorial modeling of the transverse magnetic field TM mode polarization component of optical beam 221 directed through one embodiment of optical waveguide 227 of optical an optical device 201 in accordance with the teachings of the present invention.

In the example embodiments illustrated in FIGS. 3 and 4, the substantially V shaped insulating region 211 is an oxide with a thickness of approximately 12 nanometers. As can be observed in the embodiment in FIGS. 3 and 4, optical waveguide 227 is a rib waveguide with rib region 229 having a width of approximately 3 μm and a height of approximately 1.0 μm. The slab region of optical waveguide 227 in the embodiment in FIGS. 3 and 4 is approximately 1.5 μm in height.

As can be appreciated from the vectorial modelings of FIGS. 3 and 4, the distribution of the TE and TM modes of optical beam 221 is symmetric along the horizontal direction across the substantially V shaped insulating region 211. Thus, the overlap of both the TE and TM modes of optical beam 221 over the charge modulated regions 233 is substantially equal for a given position of substantially V shaped insulating region 211 in the vertical direction. Since both of TE and TM mode polarization components of optical beam 221 are not symmetric in the vertical direction, the effective index change will be slightly dependent on the position of substantially V shaped insulating region 211 relative to the optical modes for the TE and TM mode polarization components. In one embodiment, the vertical position of substantially V shaped insulating region 211 can be adjusted to achieve polarization independent operation in accordance with the teachings of the present invention. In so doing, it is possible to have a polarization insensitive phase shift, even when the relative angle between the regions 217 and 219 of substantially V shaped insulating region 211 is not precisely 90 degrees in accordance with the teachings of the present invention.

Figure 5:
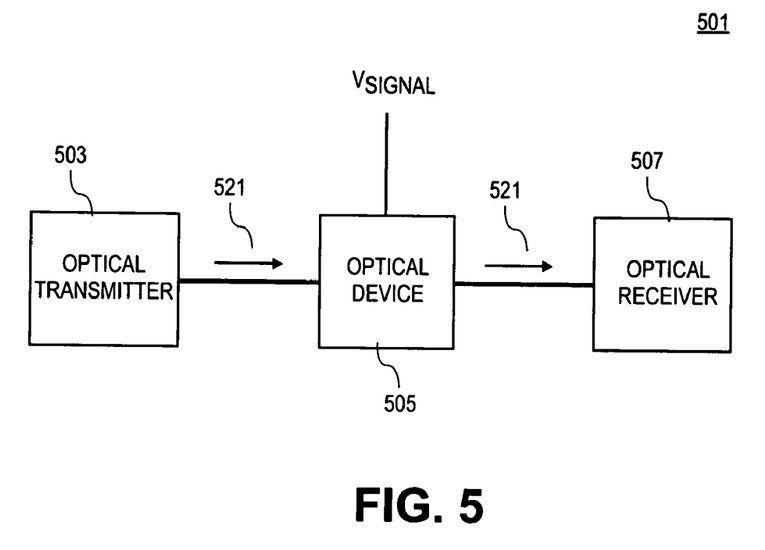
FIG. 5 is a block diagram illustration of one embodiment of a system including an optical transmitter and an optical receiver with an optical device including a one embodiment of a polarization insensitive optical phase shifter according to embodiments of the present invention.

FIG. 5 illustrates generally a block diagram of one embodiment of a system including an optical transmitter and an optical receiver with an optical device according to embodiments of the present invention. In particular, FIG. 5 shows optical system 501 including an optical transmitter 503 and an optical receiver 507. In one embodiment, optical system 501 also includes an optical device 505 optically coupled between optical transmitter 503 and optical receiver 507. As shown in FIG. 5, optical transmitter 503 transmits an optical beam 521 that is received by optical device 505. In one embodiment, optical device 505 may include for example a device such as optical device 201 described above in connection with FIGS. 2–4 to phase shift optical beam 521 in response to signal $V_{SIGNAL}$. As such, optical device 505 is independent of the polarization of optical beam 521. In such an embodiment, optical device 505 may serve as an optical delay. In another embodiment, optical device 505 may be employed in an optical amplitude modulator or the like. In various embodiments according to the teachings of the present invention, it is appreciated that optical device 505 can operate at speeds as fast as 10 GHz and beyond. As a result, an embodiment of optical device 505 in may be fabricated in for example a high-speed silicon modulator for data communication and chip-to-chip interconnect applications in accordance with the teachings of the present invention.

Figure 6:
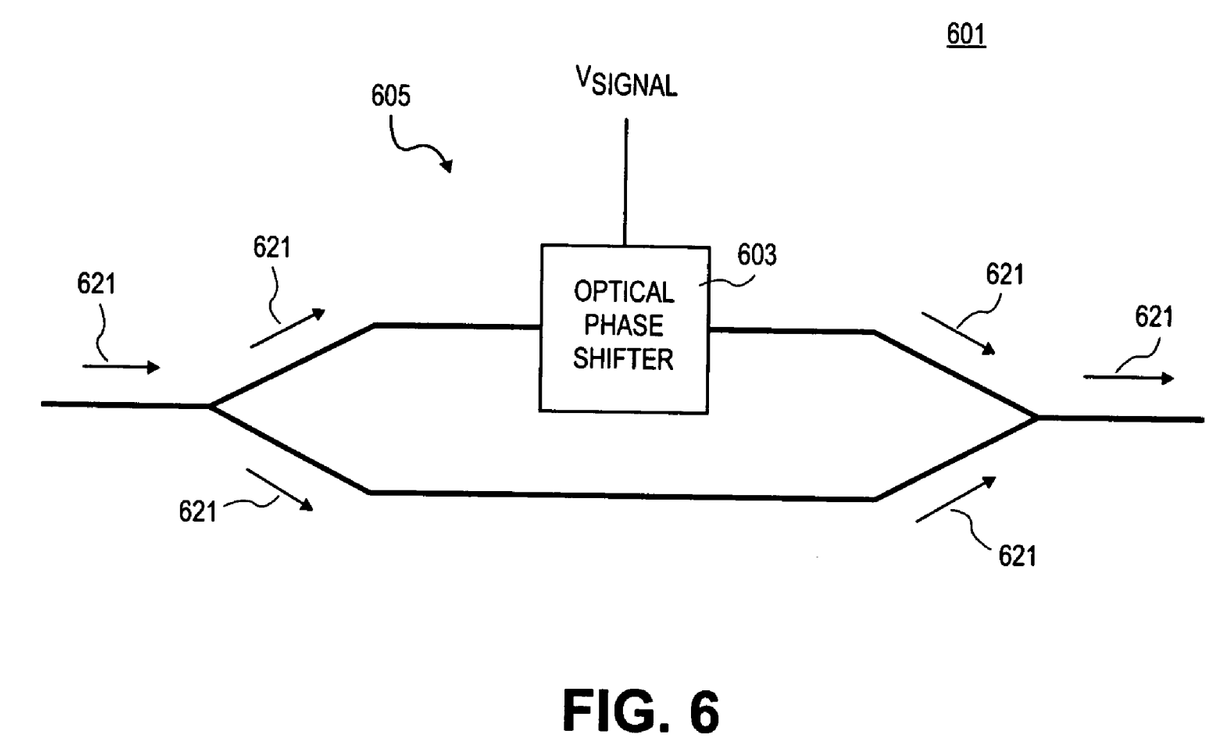
FIG. 6 is a block diagram illustration of one embodiment of an optical modulator including a Mach Zehnder Interferometer (MZI) configuration having one embodiment of a polarization insensitive optical phase shifter according to embodiments of the present invention.

For instance, in one embodiment of the present invention, a semiconductor-based optical amplitude modulator is provided in a fully integrated solution on a single integrated circuit chip. In particular, FIG. 6 illustrates generally one embodiment of an optical modulator 601 that can be employed in place optical device 505 of FIG. 5. As shown in the depicted embodiment, optical modulator 601 includes an optical phase shifter 603 in at least one of the two arms optically coupled between cascaded Y-branch couplers of a Mach-Zehnder Interferometer (MZI) configuration 605 disposed in semiconductor material. In one embodiment, optical phase shifter 603 is similar to an embodiment of optical device 201 described above in connection with FIGS. 2–4.

In operation, an optical beam 621 is directed into an input of MZI configuration 605. Optical beam 621 is split such that a first portion of the optical beam 621 is directed through one of the arms of the MZI configuration 605 and a second portion of optical beam 621 is directed through the other one of the arms of the MZI configuration 605. As shown in the depicted embodiment, one of the arms of the MZI configuration 605 includes optical phase shifter 603, which adjusts a relative phase difference between the first and second portions of optical beam 621 in response to signal $V_{SIGNAL}$. In one embodiment, the first and second portions of optical beam 621 are then merged in the semiconductor substrate such that optical beam 621 is modulated at the output of MZI configuration 605 as a result of constructive or destructive interference. In one embodiment, as shown, one of the arms of the MZI configuration 605 includes an optical phase shifter 603. In another embodiment, both of the arms of the MZI configuration 605 may include an optical phase shifter 603.

Figure 7:
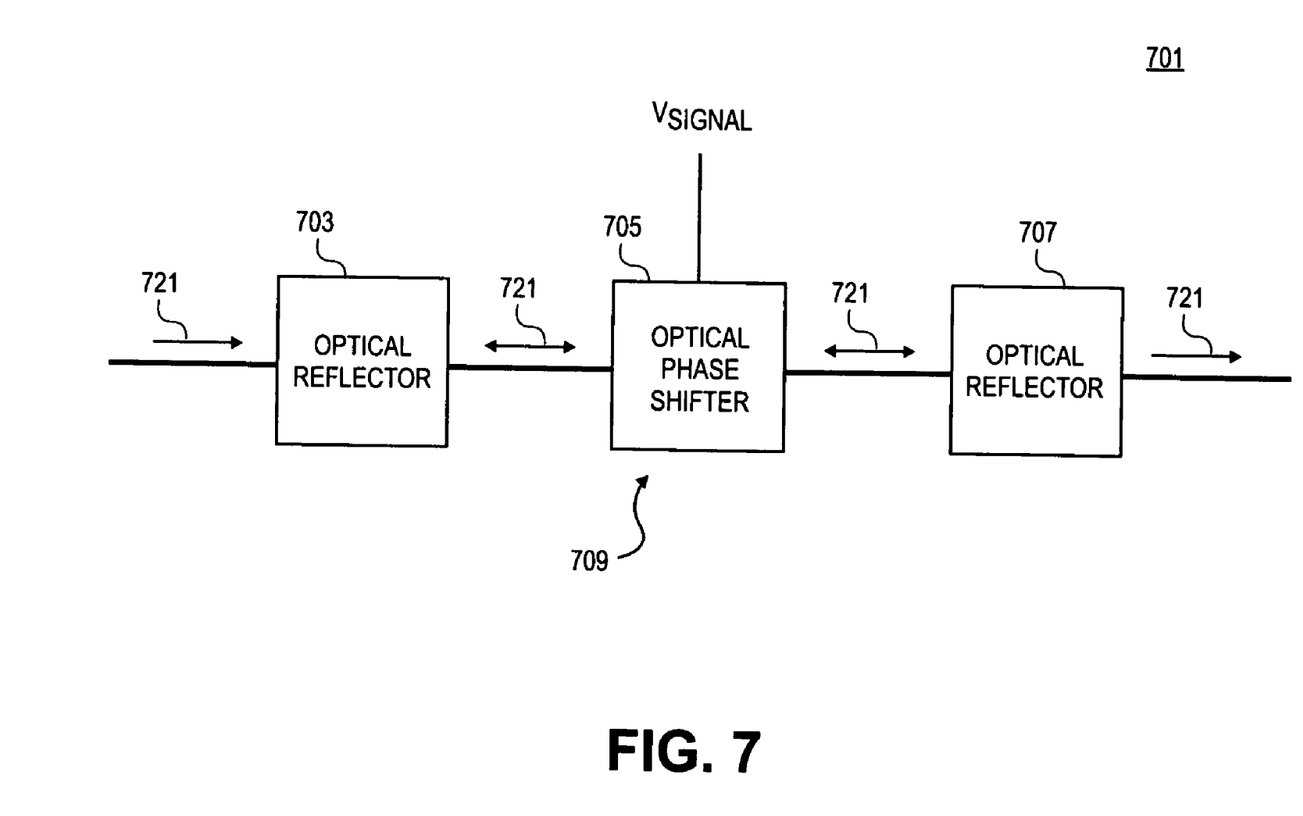
FIG. 7 is a block diagram illustration of one embodiment of an optical modulator including a Fabry-Perot cavity configuration having one embodiment of a polarization insensitive optical phase shifter according to embodiments of the present invention.

FIG. 7 is a block diagram illustrating generally an embodiment of an optical modulator including a Fabry-Perot cavity configuration having one embodiment of a polarization insensitive optical phase shifter according to embodiments of the present invention. In particular, FIG. 7 shows generally one embodiment of an optical modulator 701 that can be employed for optical device 505 of FIG. 5. As shown in the depicted embodiment, optical modulator 701 includes Fabry-Perot cavity configuration 709 defined between optical reflectors 703 and 707. In the illustrated embodiment, an optical phase shifter 705 is included in the Fabry-Perot cavity configuration 709 optically coupled between optical reflectors 703 and 707. In one embodiment, optical phase shifter 705 is similar to an embodiment of optical device 201 described above in connection with FIGS. 2–4. In one embodiment, optical reflectors 703 and 707 may be realized with Bragg gratings or the like, which are integrated in a semiconductor based optical waveguide to define Fabry-Perot cavity configuration 709.

In operation, optical beam 721 is input into Fabry-Perot cavity configuration 709 of optical phase shifter 701 through optical reflector 703. $V_{SIGNAL}$ is applied to optical phase shifter 705 to modulate the phase of optical beam 721 as optical beam 721 resonates within Fabry-Perot cavity configuration 709. By modulating the phase of optical beam 721 with optical phase shifter 705, optical beam 721 output from optical reflector 707 is modulated independent of polarization in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a first region of an optical waveguide disposed in semiconductor material, the first region having a first conductivity type;
   a second region of the optical waveguide disposed in the semiconductor material, the second region having a second conductivity type opposite to the first conductivity type; and
   a substantially V shaped insulating region disposed between the first and second regions of the optical waveguide, wherein a vertex of the substantially V shaped insulating region forms an intersecting line that is substantially parallel to an optical path of an optical beam to be directed through the optical waveguide.

2. The apparatus of claim 1 wherein the substantially V shaped insulating region is formed with at least two regions of insulating material having an intersection at the vertex of the substantially V shaped insulating region.

3. The apparatus of claim 2 wherein the two regions of insulating material are formed with a substantially orthogonal relationship between the first and second regions of the optical waveguide.

4. The apparatus of claim 1 wherein the optical waveguide comprises a rib waveguide, wherein the first region in included in a rib portion of the optical waveguide and the second region is included in a slab portion of the optical waveguide.

5. The apparatus of claim 1 further comprising a charge modulated region to be modulated along the optical path of the optical beam and proximate to the substantially V shaped insulating region between the first and second regions of the optical waveguide, the charge modulated region to modulate a phase of the optical beam to be directed through the optical waveguide.

6. The apparatus of claim 5 wherein the optical beam is an arbitrarily polarized optical beam including first and second polarization components, wherein a phase modulation of the first polarization component in response to the charge modulated region is substantially equal to a phase modulation of the second polarization component in response to the charge modulated region.

7. The apparatus of claim 6 wherein the first polarization component is a transverse magnetic field (TM) mode polarization component of the arbitrarily polarized optical beam and the second polarization component is a transverse electric field (TE) mode polarization component of the arbitrarily polarized optical beam.

8. The apparatus of claim 5 wherein the charge modulated region to be modulated in response to a signal coupled to be received by one of the first and second regions of the optical waveguide.

9. The apparatus of claim 8 further comprising a first contact coupled to the first region of the optical waveguide and a second contact coupled to the second region of the optical waveguide, the first and second contacts coupled to the optical waveguide at locations outside the optical path of the optical beam to be directed through the optical waveguide, wherein the signal is coupled to be received by a corresponding one of the first and second contacts.

10. The apparatus of claim 9 further comprising a buffer region disposed between the optical path of the optical beam and at least one of the locations outside the optical path of the optical beam to which the first and second contacts are coupled to the first and second regions, respectively, of the optical waveguide.

11. A method, comprising:
   directing an optical beam along an optical path through an optical waveguide disposed in semiconductor material;
   modulating a charge modulated region along the optical path proximate to a substantially V shaped insulating region disposed between first and second regions of the optical waveguide; and
   modulating a phase of the optical beam in response to the charge modulated region, wherein the optical beam is an arbitrarily polarized optical beam including first and second polarization components, wherein a phase modulation of the first polarization component in response to the charge modulated region is substantially equal to a phase modulation of the second polarization component in response to the charge modulated region.

12. The method of claim 11 wherein directing the optical beam along the optical path through the optical waveguide comprises directing the optical beam though the optical waveguide substantially parallel to an intersecting line formed at a vertex of the substantially V shaped insulating region through the optical waveguide.

13. The method of claim 11 wherein modulating the charge modulated region along the optical path proximate to the substantially V shaped insulating region disposed between first and second regions of the optical waveguide comprises applying an electrical signal to at least one of the first and regions the optical waveguide, wherein the first region of the optical waveguide has a first conductivity type and the second region having a second conductivity type opposite to the first conductivity type.

14. The method of claim 11 wherein the optical beam is an arbitrarily polarized optical beam including first and second polarization components, wherein modulating the phase of the optical beam includes modulating substantially equally a phase of the first polarization component of the optical beam and a phase of the second polarization component of the optical beam in response to modulating the charge modulated region proximate to the substantially V shaped insulating region disposed between first and second regions of the optical waveguide.

15. The method of claim 14 wherein the first polarization component is a transverse magnetic field (TM) mode polarization component of the arbitrarily polarized optical beam and the second polarization component is a transverse electric field (TE) mode polarization component of the arbitrarily polarized optical beam.

16. The method of claim 14 wherein the substantially V shaped insulating region is formed with at least two regions of insulating material having an intersection at a vertex of the substantially V shaped insulating region, wherein the charge modulated region proximate to the first region of the insulating material is adapted to modulate the phase of the first polarization component an amount substantially equal to an amount that the charge modulated region proximate to the second region of the insulating material is adapted to modulate the phase of the second polarization component.

17. A system, comprising:
an optical transmitter to generate an optical beam, wherein the optical beam is an arbitrarily polarized optical beam;
an optical receiver optically coupled to receive the optical beam; and
an optical device optically coupled between the optical transmitter and the optical receiver, the optical device including an optical phase shifter to modulate a phase of the optical beam, the optical phase shifter including:
a first region of an optical waveguide disposed in semiconductor material, the first region having a first conductivity type;
a second region of the optical waveguide disposed in the semiconductor material, the second region having a second conductivity type opposite to the first conductivity type; and
a substantially V shaped insulating region disposed between the first and second regions of the optical waveguide, wherein a vertex of the substantially V shaped insulating region forms an intersecting line that is substantially parallel to an optical path of the optical beam to be directed through the optical waveguide.

18. The system of claim 17 wherein the substantially V shaped insulating region is formed with at least two regions of insulating material having an intersection at the vertex of the substantially V shaped insulating region.

19. The system of claim 17 wherein the two regions of insulating material are formed with a substantially orthogonal relationship between the first and second regions of the optical waveguide.

20. The system of claim 17 further comprising a charge modulated region to be modulated along the optical path of the optical beam and proximate to the substantially V shaped insulating region between the first and second regions of the optical waveguide, the charge modulated region to modulate a phase of the optical beam to be directed through the optical waveguide.

21. The system of claim 20 wherein a phase modulation of the first polarization component in response to the charge modulated region is substantially equal to a phase modulation of the second polarization component in response to the charge modulated region.

22. The system of claim 17 wherein the optical phase shifter is included in an optical modulator included in the optical device, the optical modulator to modulate an amplitude of the optical beam directed from the optical transmitter to the optical receiver.

23. The system of claim 22 wherein the optical modulator includes a Mach-Zehnder interferometer (MZI) configuration having first and second arms, wherein the optical phase shifter is included in at least one of the first and second arms to modulate the optical beam directed through the MZI configuration.

24. The system of claim 22 wherein the optical modulator includes a Fabry-Perot cavity configuration, wherein the optical phase shifter is included in Fabry-Perot cavity configuration to modulate the optical beam directed through the Fabry-Perot cavity configuration.

* * * * *